July 28, 1970   L. ROSSI   3,521,767
VEHICLE FOR THE TRANSPORT OF A ROTATING MIXER, OR
THE LIKE, PROVIDED WITH CONTINUOUS CONVEYOR
Filed Jan. 24, 1968                                      4 Sheets-Sheet 4
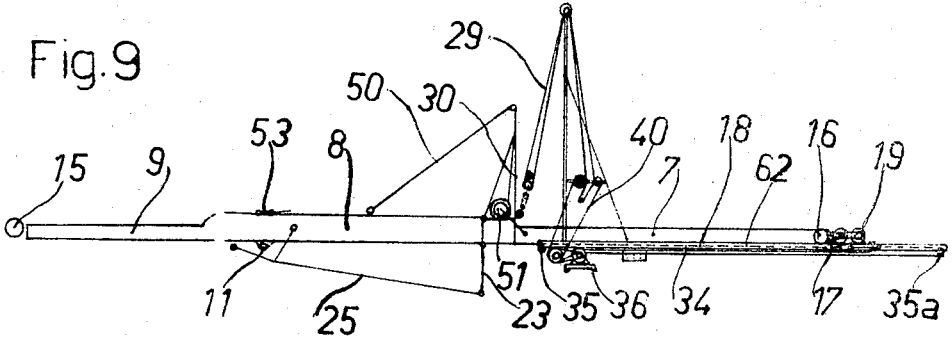
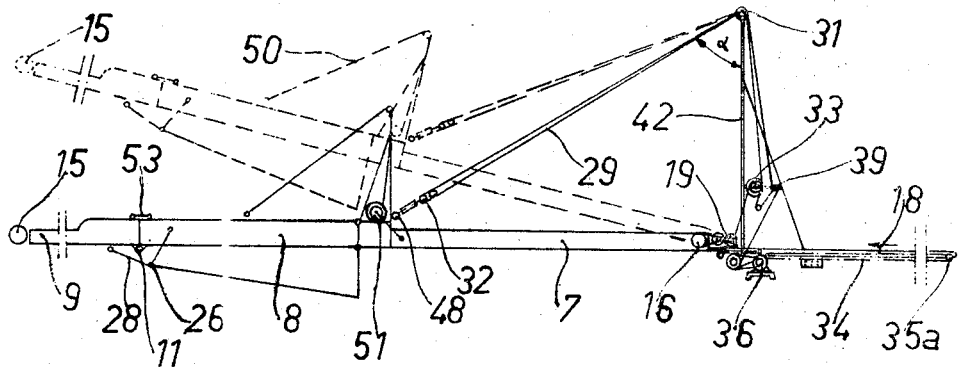
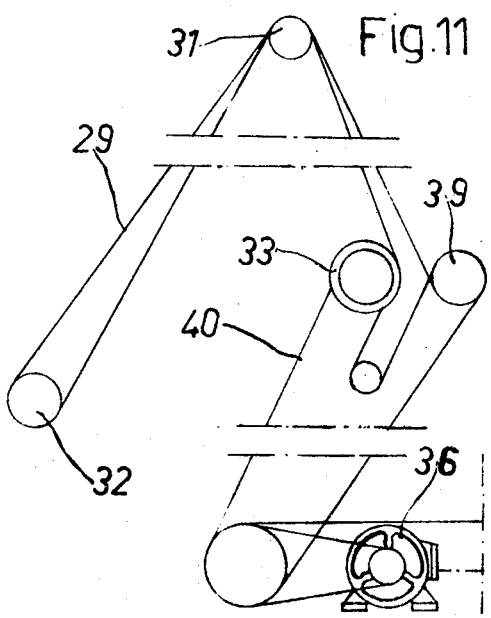
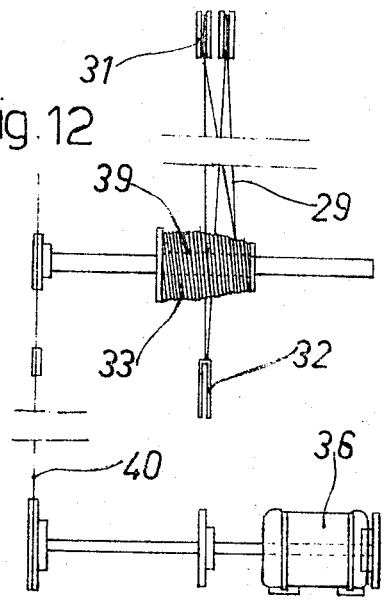
INVENTOR.
Lionello Rossi
BY Peter M. Born
Atty

United States Patent Office 3,521,767
Patented July 28, 1970

3,521,767
VEHICLE FOR THE TRANSPORT OF A ROTATING MIXER, OR THE LIKE, PROVIDED WITH CONTINUOUS CONVEYOR
Lionello Rossi, Via Tiburtina Km. 16,500, Rome, Italy
Filed Jan. 24, 1968, Ser. No. 700,220
Claims priority, application Italy, Jan. 26, 1967, 34,394/67
Int. Cl. B60p 1/36, 3/16
U.S. Cl. 214—83.26          8 Claims

ABSTRACT OF THE DISCLOSURE

The invention relates to a container transporting vehicle adapted to contain and dispense loose or plastic materials having a conveyor including a plurality of sections over which is entrained an endless belt and wherein the sections are so interconnected one with another as to permit a folded and juxtaposed relationship for retraction with respect to the vehicle and positioned along a lateral side of the vehicle. The conveyor is so mounted and arranged as to permit pivoting thereof both in a horizontal and vertical plane to any desired angular position for ultimate dispensing of the material. The conveyor when not in use is positioned to provide minimum extension beyond the vehicle and can be quickly disposed in a working position for conveying of material over considerable distances along horizontal or inclined paths as well as along paths forming an angle with respect to the longitudinal vertical center plane. The arrangement and construction of the conveyor being such that normal dispensing operation of the container is permissible during inactivation of the conveyor and inoperability thereof.

---

The present invention relates to a vehicle carrying a continuous conveyor, as, for instance, an endless band conveyor or the like; said vehicle which may be a self-propelled vehicle or not is intended to be used for carrying a container of loose or plastic materials, more particularly a rotating mixer designed for miving or keeping concrete in continual circulation during its transport; therefore the concrete may be immediately utilized when the vehicle reaches the working spot.

According to the invention, on the same frame of the vehicle carrying the mixer or other similar machine a continuous conveyor is mounted which could be an endless band or belt conveyor, an endless articulated strip or the like, which is in sections, hinged between each other so that during the movement of the vehicle, the conveyor, when not in use, is folded for minimum clearance gauge, while, at its arrival on the spot, where the carried material has to be utilized, the conveyor can quickly be put in its working position, so that the material coming out of the concrete mixer or the like falls down on said conveyor, now in its operative arrangement, and is brought to the working spot, said conveyor permitting the said material to reach a considerable distance, travelling along a horizontal or inclined path, as well as along a path forming an angle with respect to the longitudinal vertical center plane of the vehicle.

Therefore, the concrete which has been prepared, for instance, in a rotating mixer and is ready for use, can be directly carried to its utilisation spot, even if the vehicle must stop at a certain distance from said working spot. Said material can be also brought at the level of a floor having different height from the one of the vehicle. The unloading of the concrete or the like becomes thus easy and very quick, since the concrete can be moved without any further handling directly to the working spot, where it has to be used for casting foundations, as well as for the construction of pillars or floors positioned at different heights, obviously within the operative limits of the conveyor.

The concrete could also be discharged directly into containers or other suitable lifting devices, even if those were placed at a certain distance from the arrival spot of the vehicle.

The accompanying drawings show an embodiment of the invention given merely by way of example, in the case wherein the invention is applied to a motor-lorry designed for the transport of a rotating mixer;

FIGS. 8 to 10 show diagrammatic side view of several positions of all or some of the parts constituting the conveyor in the folded arrangement of the latter;

FIGS. 11 and 12 show side and front diagrammatic views of the winding drum and of the wire cables supporting the sections of the conveyor respectively.

Figure 1:
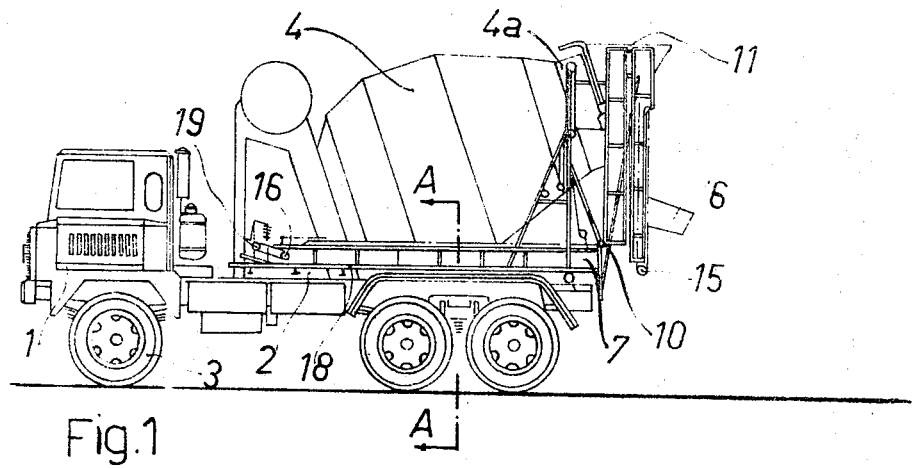
FIG. 1 shows a side elevation view of the vehicle in its transferring arrangement.

The vehicle, preferably of a self-moving type, is generally marked 1, 2 is the frame of the vehicle, while 3 are the wheels and 4 is the machine mounted on the said frame 2, said machine being, for instance, a rotating mixer or other suitable container designed for the transport of plastic, granular material or the like, which optionally must be also kept in continual circulation or must be continuously handled, said material being discharged from the rear opening 4a and falls through a hopper 5 into an inclined distribution chute 6 of an angularly displaceable type and thence on the continuous conveyor hereinafter described.

Figure 8:
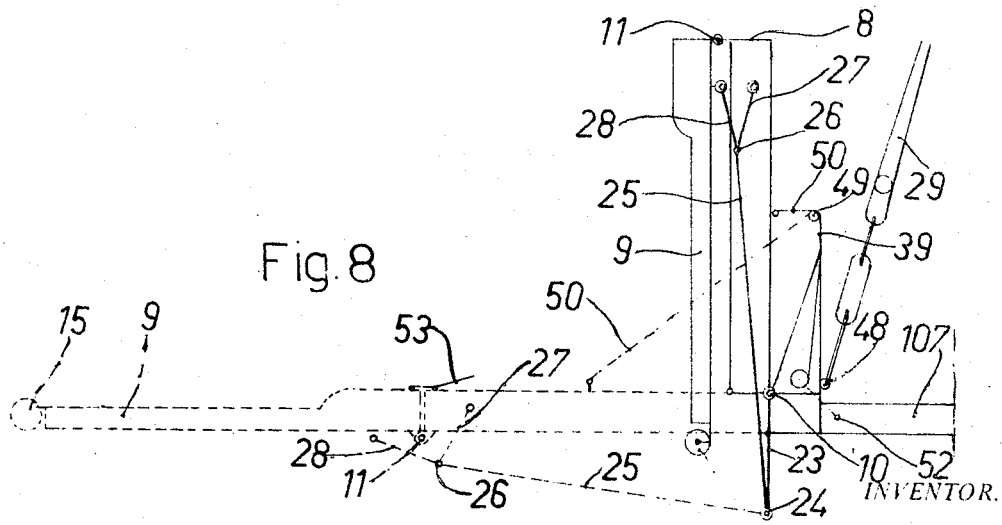

According to the present invention, a continuous conveyor may be, for instance, positioned at one of the sides of the machine 4 and is mounted on the frame 2, said conveyor being constituted of at least three sections 7, 8 and 9 which are articulated one to another and are associated with suitable means enabling the conveyor to occupy the most reduced space during the movement of the vehicle (FIGS. 1 and 8). In such an arrangement the section 7 is brought back into a housing 18 shaped similarly to a channel and which is made integral with the frame 2, while the other sections 8 and 9 are folded until they rest on each other in vertical position so that in such an arrangement the device does not exceed the whole clearance gauge of the vehicle 1.

The preferred system of the unfolding and folding operations of said conveyor will be briefly described, details being set forth hereinafter.

Figure 2:
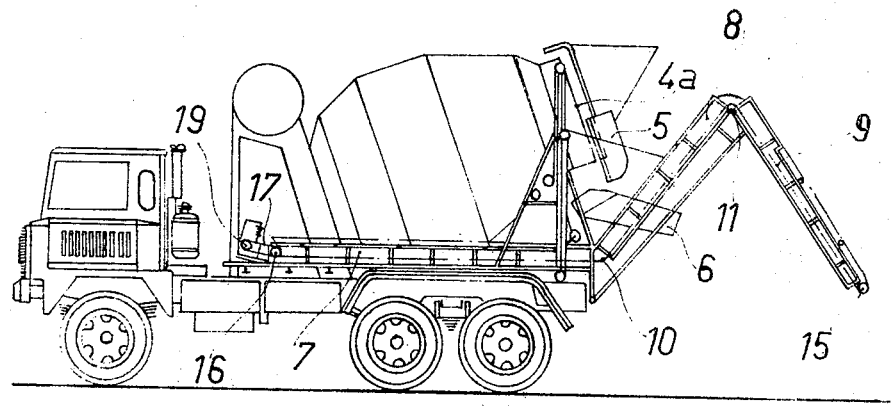
FIGS. 2 and 3 show views similar to that shown in FIG. 1; the conveyor is shown respectively in one of two intermediate successive positions of its developing phase for reaching its operative arrangement.

FIG. 1 shows the conveyor in its folded position, wherein the section 7 is horizontal and has been brought back into the housing 18 and the sections 8 and 9 have been brought in their upraised positions on the back of the vehicle. FIG. 2 shows the sections 8 and 9 when being unfolded for their alignment with the section 7.

Figure 3:
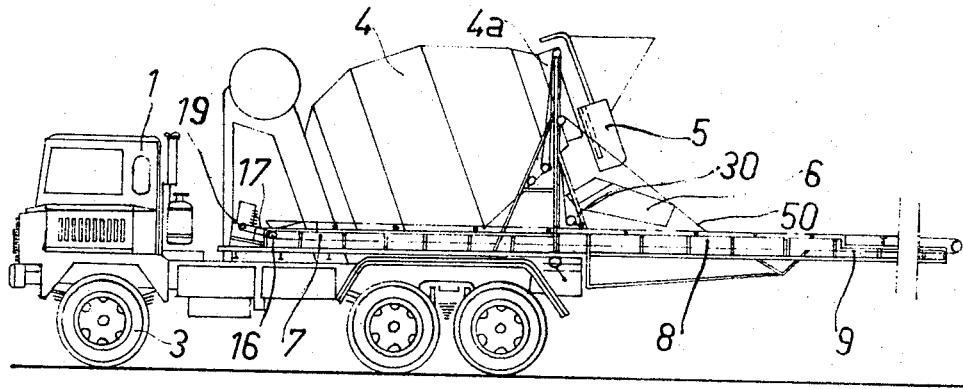

FIG. 3 shows the position, wherein the sections 7, 8 and 9 are already arranged in line, but the section 7 has not yet left its housing 18.

Figure 4:
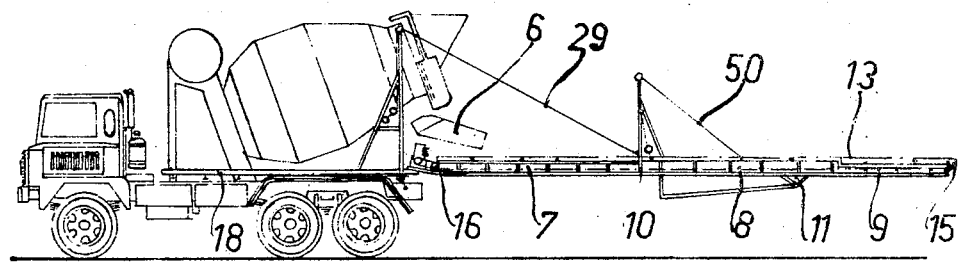
FIG. 4 shows a side elevation view of the vehicle in which the conveyor is in its operative position for moving the material along a horizontal path.

FIG. 4 shows the three sections 7, 8 and 9 of the conveyor in their operative position for the moving of the material along a horizontal path.

Figure 5:
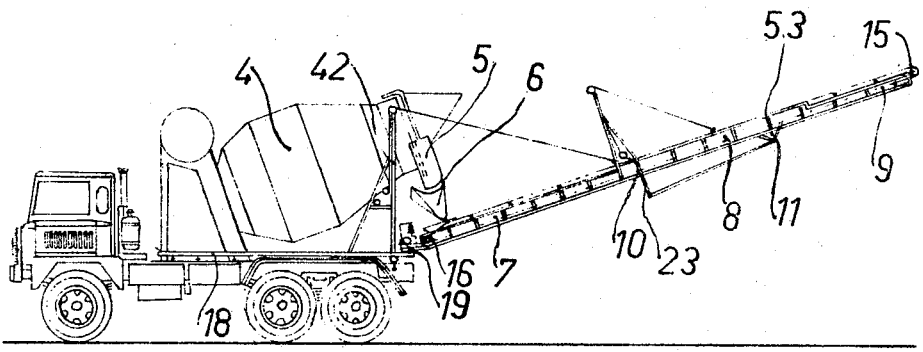
FIG. 5 shows a side elevation view of the conveyor in its operative position, when the material has to be moved to a certain distance and to a higher level than that of the loading point of the material on said conveyor.

FIG. 5 shows the conveyor in a different operative position, that is to say for transferring the material over a certain distance up to a certain height.

Figure 6:
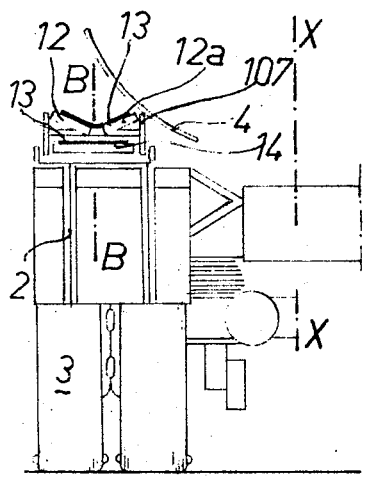
FIG. 6 is a cross sectional view of the conveyor taken along line A—A of FIG. 1.

Now describing the conveyor, it is to be noted that it is constituted, as already said, of three sections 7, 8 and 9 consisting of frames articulated among each other by means of hinges 10, 11, having horizontal axes, set at right angles with respect of the longitudinal centre plane X—X of the vehicle (FIG. 6).

Said hinges are so positioned that the sections 7 and 8 may form an angle with respect to each other, which may vary from 90° (FIG. 1) to 180° in the clockwise direction, and with its concavity facing upward, while the sections 8 and 9 may vary through an angle with respect to each other of 180° (FIGS. 1, 3 to 5) in the counterclockwise direction and with its concavity facing downwards, if reference is made to FIGS. 1 to 5, where the vehicle is oriented from left to right.

Figure 6A:
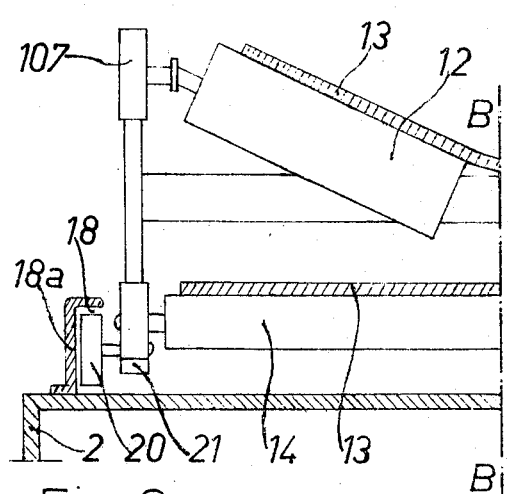
FIG. 6a is a detail of FIG. 6 in an enlarged scale.

Each section 7, 8 and 9 is constituted of a metallic frame carrying, at its upper part, pairs of free running rollers 12, 12a (FIGS. 6 and 6a), set at an angle one with respect to the other so as to form a V-like supporting means for the conveying device which is constituted in this embodiment of an endless band 13, while at its lower part idle rollers 14 are arranged having horizontal axes and designed for guiding the band 13 on its return run. At the articulation points means are provided, not shown in the drawings, adapted to guide the band 13 to match the positions of the sections 7, 8 and 9 of the conveyor during their angular displacements. At 15 is a return roller, arranged at the outer end of the last section 9 of the conveyor, while at the opposite end a driving roller 16 is provided, which is driven by an engine 19 through a suitable transmission 17, or other suitable system, said engine or motor 19 being mounted on a carriage 21, which is not connected with the frame 107 of the section 7 (FIGS. 7, 7a and 9).

The channel-like housing 18 (FIG. 6a) for the section 7 of the conveyor is made integral with the frame 2 and is constituted of two C-shaped rails 18a, inside which are housed and guided the wheels 20 of the carriage 21 supporting one of the ends of the frame 107 of the section 7 (FIGS. 7 and 7a), with which said section is connected by means of a plate-shaped arm 70, pivotally connected to a hinge 22 mounted so as to rotate around a vertical axis, so that the conveyor in its operative position, that is to say when the section 7 has been brought outside its housing 18, may be moved in different angular positions, while always keeping its longitudinal plane of symmetry B—B in vertical position, but forming different angles with respect to the vertical longitudinal center plane X—X of the vehicle (FIG. 6). These rotary movements are controlled by a screw 122, carried by the frame 107 so as to be able to rotate around a pin 71, and which is driven by a handle, provided for manual operation, said screw meshing with a nut screw 121, pivotally connected with an arm 123 securely connected with the axle 72 of the carriage 21 supporting the pivot 22.

Figure 7:
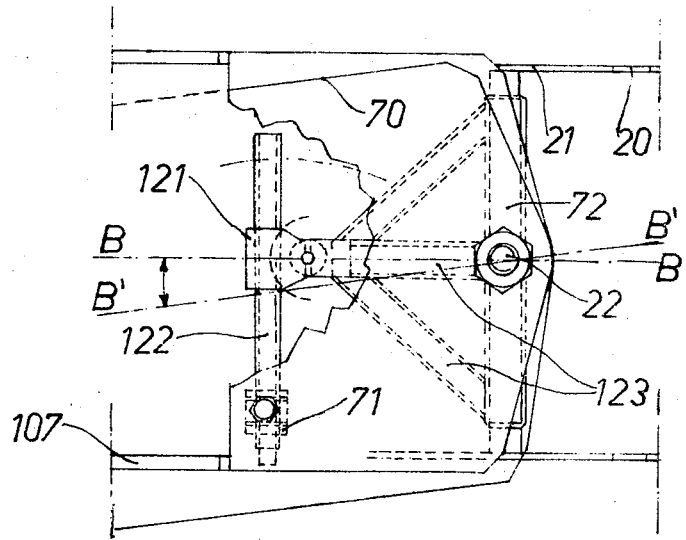
FIG. 7 shows in an enlarged scale a top view, partly broken away, of the end of conveyor which is connected with the vehicle.
Figure 7A:
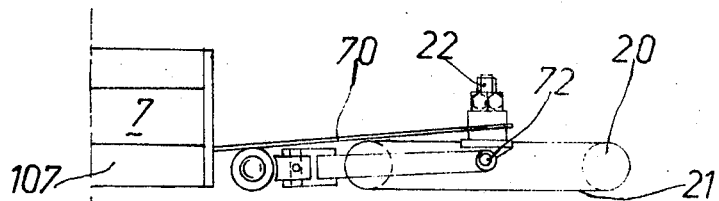
FIG. 7a is a longitudinal cross section taken along line B—B of FIG. 7.

FIG. 7 shows, in dotted lines the position of the section 7 in the case of a rotation of the plane B—B with respect to the axis of the channel-like housing 18.

In order to cause the sections 8 and 9 to move away from each other, a device is provided comprising at least a cable 50 and a crane 51, which may be operated manually by means of the crank 52 or the like, said device being associated with an articulated guiding system (FIGS. 8 to 10).

Said articulated guiding system is mounted on the end of the frame 107 of the section 7, where the hinge 10 is arranged and from which frame projects downwards a vertical arm 23.

At the end of said arm 23 a rod 25 is artculated at 24, which in turn is pivotally connected at its opposite end 26 with two rods 27 and 28, the one of which is pivotally connected to section 8 at a certain distance from its outer end, and the other is pivotally connected to the section 9 at a certain distance from its inner end. Said rod system 25, 27 and 28 forms an articulated guiding device, in which said rods act as struts so that, as the sections 8 and 9 tend to move downwards under their weight and the cable 50 may freely unwind from the crane 51, they force the sections 8 and 9 during their dowward movement to rotate around the axis of the hinge 11 and to move away one from the other, until they reach their aligned position, wherein the section 8 has turned around the axis of the hinge 10, an angle of 90° with respect to the section 7.

As aforesaid, the sections 8 and 9 are held in their folded disposition (FIG. 1) by means of at least a cable 50, which passes around a system of return pulleys 49, carried by a framework 30 integral with the section 7.

In its operative position the conveyor is supported by at least a cable 29 which is always held in tension, the winding and unwinding phase of which must be coordinated with the in and out displacement of the section 7 with respect to its housing 18. In fact as the sections 7, 8 and 9 have to be brought forward in their aligned arrangement so as to pass from the position shown in FIG. 3 to the one of FIG. 4, it is necessary that, while the section 7 is moved forward together with the sections 8 and 9, a preestablished length of the cable 29 must be suitably unwound so that the cable 29 be always in tension.

The cable 29 is led over the pulley 31 mounted on the top of the framework 42 securely fixed to the frame 2, as well as over the pulley 32 connected to the end 48 of the section 7.

The increase in the free length of the cable 29 depends upon the Law according to which the hypotenuse 48–31 of the right angle triangle increases; the vertical leg of said triangle has, on the contrary, a constant length and is constituted by the framework 42, while the other leg is formed by the portion of the section 7 which projects out of the housing 18, and the length of which increases progressively.

Since said increase of the length must be variable over time, the invention provides that the cable 29 may be wound around a helically grooved drum 33 (FIGS. 10 to 13) which must act as a cam. To such a purpose, the outer surface is so shaped that the radius of the cross section of the helically shaped groove for the cable 28 varies gradually; that is to say, the central line of said groove has a helical path, where the turns have a constant pitch which will be substantially slightly bigger than the diameter of the cable 29, while the distance from the axis of the drum 33 of each point of said center line of the groove varies according to the above mentioned Law of variation, in such a manner as to always keep the cable 29 in tension and the axis B—B of the conveyor in horizontal position. It is to be noted, that at the beginning of the forward displacement of the section 7 (FIG. 9) the increase of the free length of the cable 29 must be extremely reduced, the cross section of the cable being, on the contrary, comparatively big, due to the stresses in question. According to the preferred embodiment shown in the drawings, provision is made that the forward movement of the section 7 is obtained by the same motor 36 controlling the drum 33; as a result, at the end of the said cam-drum 33 on which at the beginning the cable 29 starts to unwind, said drum 33 would have a very small radius. But that cannot be accepted, owing to the size and relative stiffness of the cable 29 which cannot admit too small curvatures. In order to increase the minimum radius of the shaped drum 33, a second cylindric drum 39 is associated to the former one, which has a radius not smaller than the minimum value of the radius of curvature compatible for the cable 29. In this case each turn of the helical groove of the drum 22 will have a length according to the formula $2\pi r + f(\alpha)$, where $f(\alpha)$ is the increment which must be given to the free length of the cable 29 as the angle between the hypotenuse 48–31 of the triangle, and the leg 42 increases. According to such a solution, at each turn the drum 33 sets free a length $2\pi r + f(\alpha)$ of cable, but a portion $2\pi r$ of this latter is recovered by the drum 39, so that the increase of the free portion of the cable will be $f(\alpha)$, the drums 33 and 39 both being driven by the same motor 39 through the transmission 40.

Therefore it results that in a practical and acceptable manner the cable 29 is set free in lengths which in successive units of time are progressively increasing and that is achieved by using a cam-drum 33 associated with a cylindrical recovery drum 39, while according to a Law based on an opposite sequence, the cable 29 will be wound around the drum 33.

As aforesaid, the section 7 comes out its housing 18 at the same time as the cable 29 progressively unwinds. For such a purpose along the rail housing 18 at least one endless chain is arranged sliding on the return rollers 35 and 35a, said chain being driven by a transmission pulley driven by the motor 36. Said chain 34 may be connected with the rear end of the section 7 by means of a disconnectable device 62, so that, as the chain is caused to travel in the direction of the arrow in FIG. 10, said chain 34 causes the section 7 to move out of the housing 18, said section 7 being now aligned with respect to the sections 8 and 9 so that the conveyor can be brought in the horizontal operative position (FIGS. 4 and 10). The operation according to the opposite sequence causes the section 7 to be brought back in the position of FIG. 3. Stop means will be also provided (not shown in the drawings) adapted to fix the section 7 in its final positions with respect to the housing 18 and therefore with respect to the frame 2 of the vehicle; furthermore, stop means are also provided to stop the motor 36 at said final positions and to reverse the direction of running of the motor. At the same time as the section 7 comes out of the housing 18, the cable 29 is unwound for such a length that said cable is kept always in tension and the sections 7, 8 and 9 remain arranged in line with respect to one another according to a horizontal direction.

If the conveyor has to move the material at a certain level, a locking means 53 will be inserted in correspondence of the hinge 11 so as to fix the three sections, 7, 8 and 9 and the device 62 will be disconnected.

Thence the group, which now acts as a single unit, may be moved towards the desired angular position (said position being shown by dotted lines on FIG. 10), by causing a suitable length of cable 29 to be recovered on the drum 33, after the reversal of the motor 36.

In the positions shown in FIGS. 4 and 5 the conveyor is so positioned as to be able to receive the material which progressively falls out from the mixer 4 or the like, passing through the hopper 5 and the orientable guiding chute 6 so as to convey it to the working spot or to a place where it is loaded on another transport and/or lifting means.

As has hereinabove been stated, the inner end of the section 7 rests on the carriage 21 which is connected by means of a joint 22 having a vertical rotation axis so as to allow obtaining any desired angular position of the vertical plane of symmetry B—B of the conveyor with respect to the vertical longitudinal plane of symmetry X—X of the vehicle.

In this case it is sufficient to operate the screw 122 until the arm 77 together with the frame 107 reaches the desired angular position. As soon as this position has been attained, the conveyor will be locked with respect to the carriage 21 or to frame 2 of the vehicle supporting this latter, by suitable means not shown in the drawings.

It is obvious that two conveyors could be also arranged one on each side of the vehicle; in particular cases the housing for the coming in section 7 could be located in any other suitable position, as, for instance, underneath the platform 2 of the vehicle 1, suspending the conveyor between the wheels 3 of the vehicle.

What is claimed is:

1. In a framed vehicle for the transport of a rotating mixer and the like container for loose or plastic materials having a conveyor of an extendable and foldable type mounted along a lateral side of said vehicle, said conveyor consisting of a continuous transporting apparatus operable to a retracted position such as to occupy a minimum space externally of said vehicle and extendable with respect to said vehicle to an operative position, means for guiding material from the container to fall on said conveyor, mounting means for said conveyor operable for angular displacement of said conveyor to desired horizontal and vertical angular positions, said conveyor including an endless band and at least three sections, hinge means interconnecting said sections for respective articulation about horizontal axes disposed at right angles to the vertical plane of symmetry of the conveyor, said sections including frames, a plurality of rollers designed for guiding the endless band mounted on said frames, a channel-like housing connected with the vehicle at the end of the conveyor, said first section being so shaped as to be movable into or out of said housing, and drive means for driving the endless band including a motor and a transmisison.

2. A vehicle according to claim 1, a wheeled carriage on said vehicle, the first said conveyor section including a frame which at its end contacting the end of the conveyor is connected with said carriage, rails on said channel-like housing formed integral with the vehicle and mounting said carriage, said carriage supporting said drive motor for driving the endless band, vertical axis joint means interconnecting said first section and said carriage for controlling angular displacement of the carriage and first section and for locking them in a desired angular position.

3. A vehicle according to claim 2, wherein said first section of said conveyor is carried by said carriage slidable along sad channel-like housing and being movable in or out of said housing, a chain transmission driven by said motor to move said carriage, a rotatable drum, a cable entrained around said drum connected to a conveyor portion outwardly projecting from said vehicle, said cable being automatically windable or unwindable with respect to said drum and means for maintaining tension on said cable as said first section moves in or out of said housing, automatic stop means for stopping said motor in inner and outer limit positions of said first section and operable to control reversal of the run of said chain and said cable and means for locking said first section with respect to the frame of said vehicle in the two limit positions.

4. A vehicle according to claim 3, wherein second and third sections of said conveyor are interconnected with a system of articulated guiding rods, a pulley system including cables associated with said guiding rods, a crane associated with said pulley system, said cables being secured to said second section of the conveyor and permitting by their free length becoming longer or shorter in conjunction with the articulated guiding system to enable said section to attain the operative position of the conveyor or retracted postion thereof in a minimum space, said system of articulated guding rods permitting angular displacement for movement into retracted or extended positions.

5. A vehicle according to claim 4, wherein the interconnecting hinge between said second and third portions is so arranged as to permit said second section to move upwards in a clockwise direction until set at right angles with respect to the axis of said first section, and said third section can rotate to a rest position against said second section by rotation through an angle of 180°.

6. A vehicle according to claim 5, wherein means are included and associated with the cable to control the increasing or decreasing of a free length of the cable in relation to movement of said first section of the conveyor into or out of said housing, said cable being anchored to the outer end of said first section, said control means including a cam drum having a helical groove, the curvature radius thereof gradually varying, said helical groove being operable to guide the cable during winding or unwinding of the cable around the drum so as to vary the length of the cable wound on said drum or unwound therefrom for maintaining desired operating conditions of said cable.

7. A vehicle according to claim 6, wherein a pulley connects said cable at the outer end of said first section of said conveyor, a framework connected to the vehicle frame, return pulleys and a mounting framework securely connected to the frame of the vehicle, a cam drum, said cable being anchored at one end thereof to said cam drum, a cylindrical drum, said cable being anchored at the other end thereof to said cylindrical drum, said cam drum and said cylindrical drum having helical grooves, a motor operatively connected to both said drums for driving thereof in a direction permitting unwinding of the cable from the cam drum, and wnding on said cylindrcal drum whereby unitary increments or decrements of free length of the cable will be equal to the difference between the lengths of 2 turns of the cable on said drums which in a given time interval one drum releases and the other recovers.

8. A vehicle according to claim 7, wherein an endless chain extends along said housing of said first conveyor section, said cylindrical drum being connected to said chain for movement thereof, said chain being detachably connected with said housing, means for locking said sections of said conveyor in aligned positions, so that when said latter locking means is operative and the chain disconnected from said first conveyor section, in the operative position of the latter, said latter section can rotate, moving along its vertical plane, when the cable carrying the conveyor is caused to move in an appropriate direction, the parts thereafter being lockable in the attained position, by said locking means and said position being the desired angular operative position.

References Cited

UNITED STATES PATENTS

| | | | |
|---|---|---|---|
| 199,666 | 1/1878 | Shepard | 198—115 |
| 817,952 | 4/1906 | Bartholomew | 198—87 XR |
| 1,015,939 | 1/1912 | Brunelle | 198—87 XR |
| 3,255,899 | 6/1966 | Mengel | 214—83.26 XR |
| 3,402,805 | 9/1968 | Spellman | 198—139 |

ALBERT J. MAKAY, Primary Examiner

U.S. Cl. X.R.

198—87, 89